(12) United States Patent
Doolan et al.

(10) Patent No.: US 8,899,678 B2
(45) Date of Patent: Dec. 2, 2014

(54) RECLINABLE CHILD SEAT ASSEMBLY

(75) Inventors: William Doolan, Alpharettan, GA (US); Daniel Brunick, Roswell, GA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/602,034

(22) Filed: Aug. 31, 2012

(65) Prior Publication Data
US 2014/0062152 A1 Mar. 6, 2014

(51) Int. Cl.
*A47C 1/08* (2006.01)

(52) U.S. Cl.
USPC .................................................. 297/256.13

(58) Field of Classification Search
USPC ............. 297/256.1, 256.13, 256.16, 250.1, 297/302.1, 302.5
See application file for complete search history.

(56) References Cited

U.S. PATENT DOCUMENTS

| | | | |
|---|---|---|---|
| 4,762,364 A * | 8/1988 | Young | 297/256.12 |
| 6,857,700 B2 * | 2/2005 | Eastman et al. | 297/250.1 |
| 7,073,859 B1 | 7/2006 | Wilson | |
| 7,246,855 B2 * | 7/2007 | Langmaid et al. | 297/256.13 |
| 8,474,907 B2 * | 7/2013 | Weber et al. | 297/256.16 |
| 2012/0074748 A1 | 3/2012 | Brunick et al. | |

FOREIGN PATENT DOCUMENTS

EP 2272708 2/2012

\* cited by examiner

*Primary Examiner* — David R Dunn
*Assistant Examiner* — Jody Giacoman
(74) *Attorney, Agent, or Firm* — Lempia Summerfield Katz LLC

(57) ABSTRACT

A child seat assembly has a base to rest on a vehicle seat, a seat shell, and a recline mechanism that selectively permits adjustment of the seat shell between first and second recline positions and includes a recline positioner, pin, biasing element, and handle. The recline positioner has first and second portions defining the first and second recline positions, respectively. The pin is movable between a released position and an engaged position in which the pin is configured to engage the first or second portion to retain the seat shell in the corresponding first or second recline position. The biasing element is coupled to the pin and configured to bias the pin to the engaged position. The handle is operable to move the pin from the engaged position to the released position in which the seat shell is movable between the first and second recline positions.

20 Claims, 12 Drawing Sheets

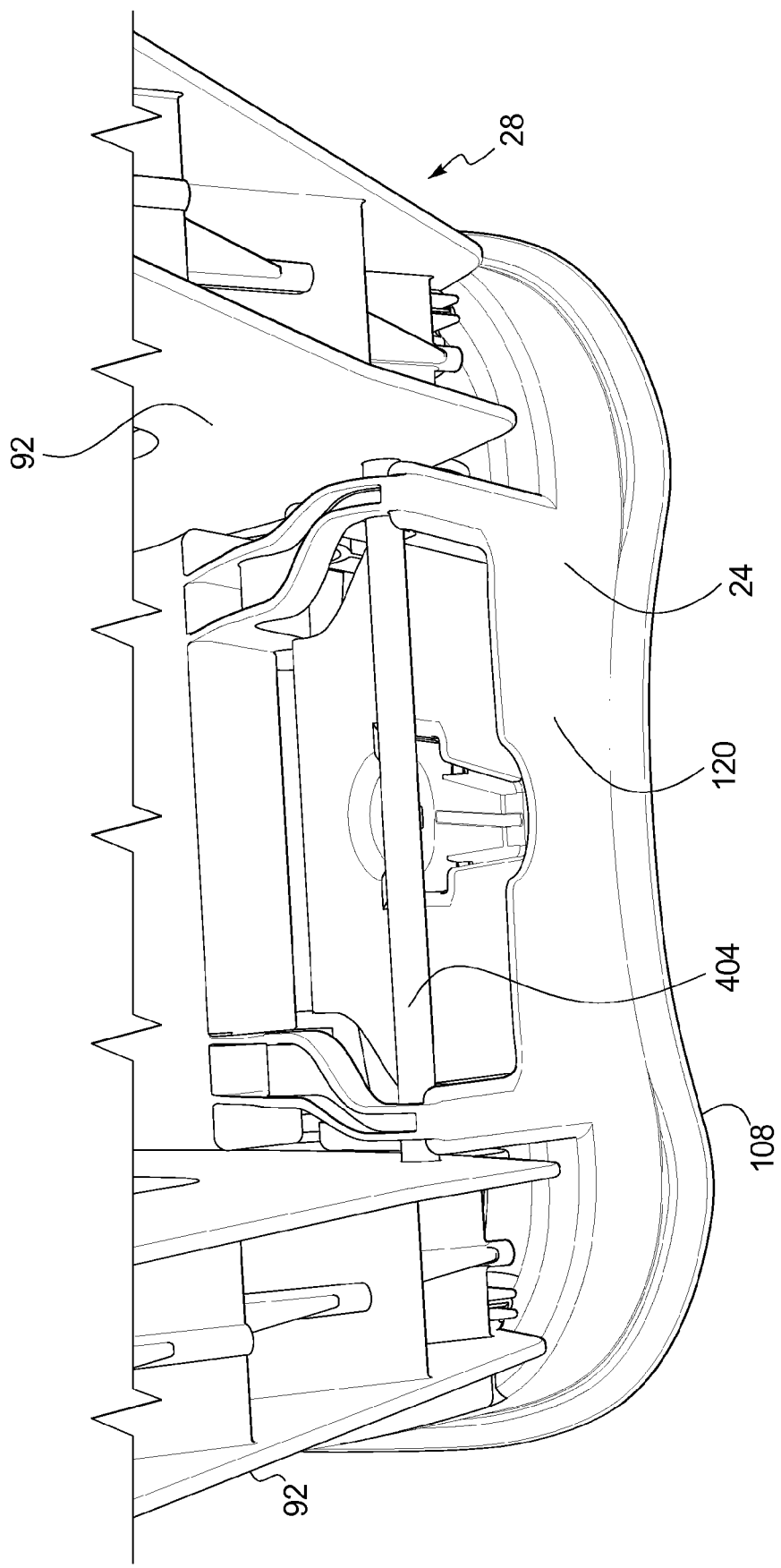

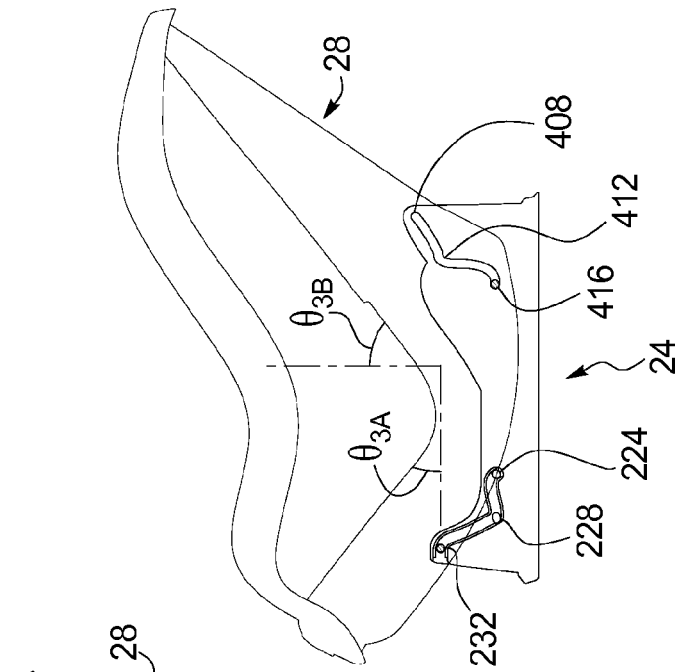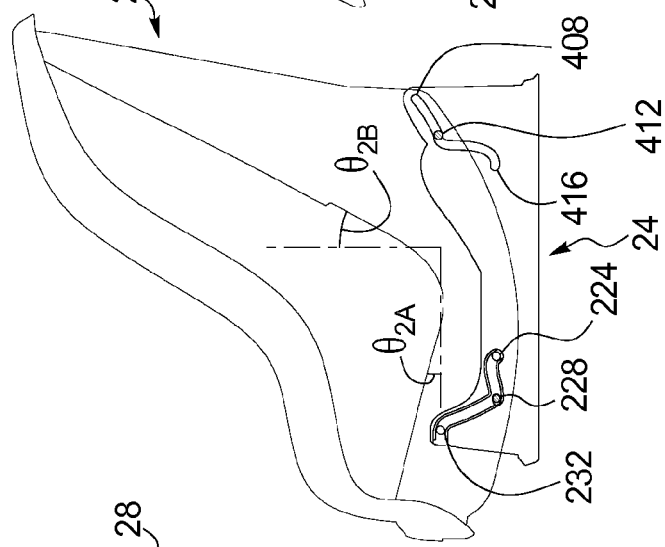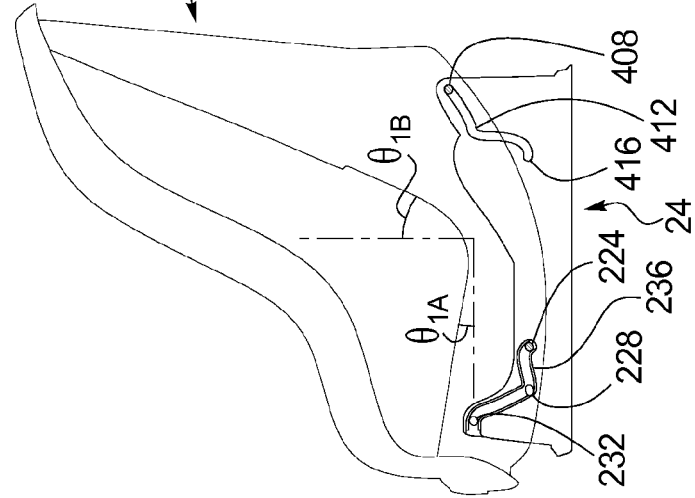

RECLINABLE CHILD SEAT ASSEMBLY

BACKGROUND OF THE INVENTION

1. Field of the Disclosure

The present disclosure is generally directed to infant or children's car seats, and more particularly to a reclinable car seat and a recline mechanism for same.

2. Description of Related Art

Children's vehicle safety seats or car seat assemblies are known in the art. Many known car seats employ a seat body or seat shell coupled to a seat base that rests on the vehicle seat. Such car seats typically have a relatively tall or high seat base such that when the car seat is installed on a seating surface of the vehicle, the seat shell and the child occupant are substantially elevated above, or relative to, the seating surface of the vehicle. The tall overall seat height can affect the view of the driver and can be undesirable aesthetically. Also, the center of gravity of both the seat assembly and the child can be relatively high. Such car seats can thus also be disadvantageous during a crash and/or when installed in a smaller vehicle.

Some of these types of car seats are configurable between different recline positions. Such car seats often include a recline mechanism that allows the user or caregiver to reconfigure the car seat between the different recline positions. The recline mechanism typically resides at least in part on the base, which can increase the base height, causing or contributing to the above-noted disadvantages.

In one example disclosed in U.S. Pat. No. 7,073,859, a recline mechanism having a rack-and-pinion type gear is disposed between a seat body or shell and a seat base. The mechanism includes an arcuate rack located in a recliner back plate underneath the seat body that interacts with a pinion gear disposed on the base. The pinion gear, which is driven by a motor, can be moved to adjust the recline or incline of the seat body. The recline mechanism is elaborate and relatively expensive, which may make the car seat cost prohibitive to many consumers and caregivers. The motor may also be noisy, potentially malfunction, and be difficult and/or expensive to repair.

In some known reclinable car seats, the recline mechanism is manually operable. However, such mechanisms typically include a relatively significant number of parts. The result is a recline mechanism that is difficult and time-consuming to manufacture and assemble and is complex and not intuitive to operate when a user attempts to adjust the car seat among different selectable seat recline positions.

SUMMARY

In one example according to the teachings of the present invention, a reclinable child seat assembly has a support base, a seat shell, and a recline mechanism. The support base is configured to rest on a dedicated seat of a vehicle. The seat shell defines a seat back, a seat bottom, and a seating surface and is supported on the support base. The recline mechanism is configured to selectively permit adjustment of the seat shell relative to the support base between a first recline position and a second recline position different than the first recline position. The recline mechanism includes a recline positioner, a pin, a biasing element, and a release handle. The recline positioner has a first portion that defines the first recline position and a second portion that defines the second recline position. The pin is movable between a released position and an engaged position. In the engaged position, the pin is configured to engage a selected one of the first and second portions of the recline positioner to retain the seat shell in the corresponding first or second recline position. The biasing element is coupled to the pin and is configured to bias the pin to the engaged position. The release handle is operable to move the pin from the engaged position to the released position out of engagement with the first and second portions of the recline positioner. When the pin is in the released position, the seat shell is movable between the first recline position and the second recline position.

In one example, the recline positioner can include a track extending between the first and second portions. The first portion can be a first aperture and the second portion can be a second aperture.

In one example, the biasing element can be a leaf spring.

In one example, the biasing element can be a leaf spring and the pin can protrude from the leaf spring. The leaf spring and pin can be formed as a one-piece integral component.

In one example, the recline positioner can include a driving ramp and a contact surface. The release handle can move the driving ramp and the contact surface relative to one another to move the pin from the engaged position to the released position.

In one example, the release handle can have an actuator positioned along a front edge of the seat bottom of the seat shell and an arm that extends rearward from the actuator.

In one example, the release handle can have an actuator positioned along a front edge of the seat bottom of the seat shell and an arm that extends rearward from the actuator. The pin can have a contact surface and the arm can have a driving ramp engaging the contact surface. The release handle can move the arm and the driving ramp to move the pin from the engaged position to the released position.

In one example, the release handle can have an actuator positioned along a front edge of the seat bottom of the seat shell and an arm that extends rearward from the actuator. The pin can have a contact surface and the arm can have a driving ramp. The driving ramp can be provided in a recess in the arm. The contact surface can be a protrusion that projects from the pin or the biasing element and can be seated against the driving ramp within the recess.

In one example, the reclinable child seat assembly can include a guide slot and a guide bar. The guide slot can be on the base or on the seat shell. The guide slot can define a first slot position corresponding to the first recline position and a second slot position corresponding to the second recline position. The guide bar can be carried on the other of the seat shell and the base and can be received in the guide slot. The guide bar can slide along the guide slot between the first slot position and the second slot position when the seat shell is moved between the first and second recline positions.

In one example, the reclinable child seat assembly can include a guide slot and a guide bar. The guide slot can be open horizontally on the base. The guide slot can define a first slot position corresponding to the first recline position and a second slot position corresponding to the second recline position. The guide bar can be fixedly attached to the seat shell and can extend laterally through the guide slot. The guide bar can slide along the guide slot between the first slot position and the second slot position when the seat shell is moved between the first and second recline positions.

In one example, the reclinable child seat assembly can include a guide slot and a guide bar. The guide slot can be on the base. The guide slot can define a first slot position corresponding to the first recline position and a second slot position corresponding to the second recline position. The guide bar can be carried on the seat shell and can be received in the guide slot. The guide bar can slide along the guide slot between the first slot position and the second slot position when the seat shell is moved between the first and second recline positions.

In one example, the recline positioner can have a third portion that defines a third recline position of the seat shell different from the first and second recline positions.

In one example, the recline mechanism can have two of the recline positioners, two of the pins, and two of the biasing elements. The two recline positioners can be laterally spaced apart across the child seat assembly. Each pin can be associated with a respective one of the two recline positioners. Each biasing element can be coupled to a respective one of the two pins.

In one example, the recline mechanism can have two of the recline positioners, two of the pins, and two of the biasing elements. The two recline positioners can be laterally spaced apart across the child seat assembly. Each pin can be associated with a respective one of the two recline positioners. Each biasing element can be coupled to a respective one of the two pins. The release handle can include two arms. Each arm can move a respective one of the two pins from the engaged position to the release position.

In one example, the recline mechanism can have two of the recline positioners, two of the pins, and two of the biasing elements. The two recline positioners can be on and laterally spaced apart across the child seat assembly. Each pin can be associated with a respective one of the two recline positioners. Each biasing element can be coupled to a respective one of the two pins. The pins, biasing elements, and the release handle can be mounted to the seat shell beneath the seating surface.

In one example, the recline positioner can be on the support base. The biasing element, the pin, and the release handle can be mounted to the seat shell. In one example, the arrangement of these components can be reversed with the recline positioner on the seat shell and the biasing element pin, and/or release handle on the support base.

In one example according to the teachings of the present invention, a reclinable child seat assembly has a support base, a seat shell, and a recline mechanism. The support base is configured to rest on a dedicated seat of a vehicle. The seat shell defines a seat back, a seat bottom, and a seating surface and is supported on the support base. The recline mechanism is configured to selectively permit adjustment of the seat shell relative to the support base between a first recline position and a second recline position different than the first recline position. The recline mechanism includes a track, a pin, a biasing element, and a release handle. The track has a first aperture that defines the first recline position and a second aperture that defines the second recline position. The pin is movable between a released position and an engaged position. In the engaged position, the pin is configured to engage a selected one of the first and second portions of the recline positioner to retain the seat shell in the first and second recline positions, respectively. The biasing element is coupled to the pin and is configured to bias the pin to the engaged position. The release handle is operable to move the pin from the engaged position to the released position out of engagement with the first and second apertures. When the pin is in the released position, the pin is slideable along the track between the first aperture and the second aperture and the seat shell is movable between the first recline position and the second recline position.

In one example, the biasing element can be a leaf spring.

In one example, one or more contact surfaces can protrude from around the pin. A portion of the release handle can include one or more corresponding driving ramps that engage the one or more contact surfaces, respectively, of the pin. The release handle can move the one or more driving ramps relative to the one or more contact surfaces, respectively, to move the pin from the engaged position to the released position.

In one example, the reclinable child seat assembly can include a guide slot and a guide bar. The guide slot can be on the support base and can define a first slot position corresponding to the first recline position and a second slot position corresponding to the second recline position. The guide bar can be carried on the seat shell and can be received laterally through the guide slot. The guide bar can slide along the guide slot between the first and second slot positions when the seat shell is moved between the first and second recline positions.

BRIEF DESCRIPTION OF THE DRAWINGS

Objects, features, and advantages of the present invention will become apparent upon reading the following description in conjunction with the drawing figures, in which:

FIG. 8 shows a partial cut-away rear view of the car seat in FIG. 1;

FIG. 9 shows a simplified schematic side view of the car seat in FIG. 1 and in a first recline position.

FIG. 13 shows the car seat in FIG. 9 but in a second recline position

FIG. 14 shows the car seat in FIG. 9 but in a third recline position.

DETAILED DESCRIPTION OF THE DISCLOSURE

A reclinable car seat assembly or car seat is disclosed herein that solves or improves upon one or more of the above-noted and/or other problems and disadvantages with prior known car seats. The disclosed car seat includes a seat shell coupled to a short or low-profile support base. Portions of the seat shell are seated or positioned within portions of the support base such that the bottom of the seat shell is situated close to or near the vehicle seat upon which the car seat rests. The result is a seat shell with a lower center of gravity than the known car seats described above. The child seated in the seat shell will also have a lower center of gravity than a child seated in the known car seats described above. As a result, the disclosed car may be capable of better performance during a crash, less obstructive to the rear view of a driver, more aesthetically pleasing (by reducing the overall height of the seat shell), and fit better in smaller, more compact vehicles. The disclosed car seat also employs a recline mechanism configured to selectively permit adjustment of the seat shell relative to the support base between at least two different recline positions. The disclosed recline mechanism has a release handle operable to render the seat shell movable between different recline positions. The disclosed car seat is relatively easy to move between the different recline positions simply by actuating the release handle. The disclosed recline mechanism and car seat are also configured to take up little space, allowing the seat shell to rest very low on the base when installed. These and other objects, features, and advantages of the present invention will become apparent upon reading the following disclosure and reviewing the accompanying drawing figures.

The terms inward (or inwardly), outward (or outwardly), top, bottom, side, front, rear, and the like are used herein merely for reference and are not intended to limit in any way the specific position or particular orientation of any components of the car seat 20.

Figure 1:
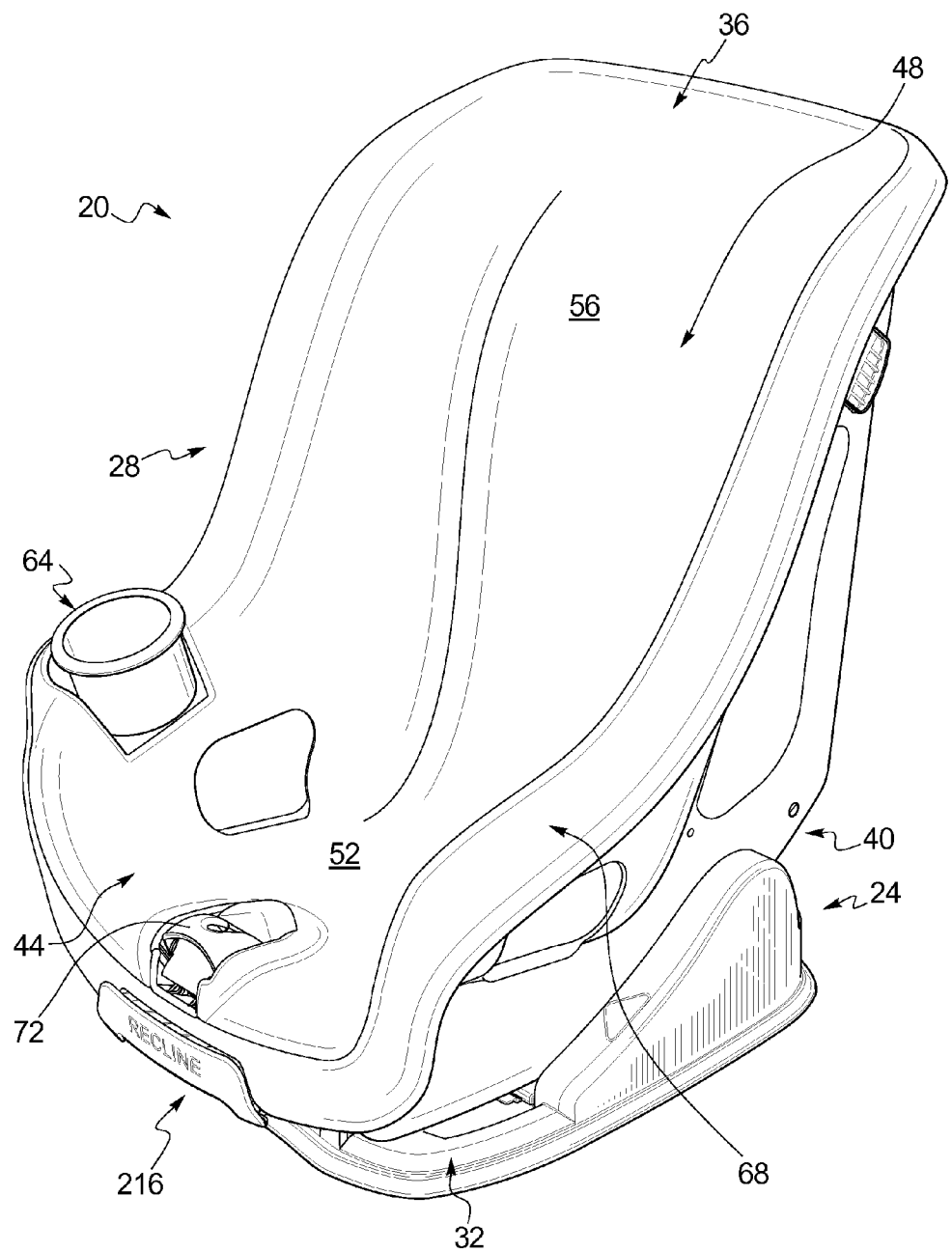
FIG. 1 shows a perspective view of one example of a car seat or reclinable child seat assembly constructed in accordance with the teachings of the present invention.
Figure 2:
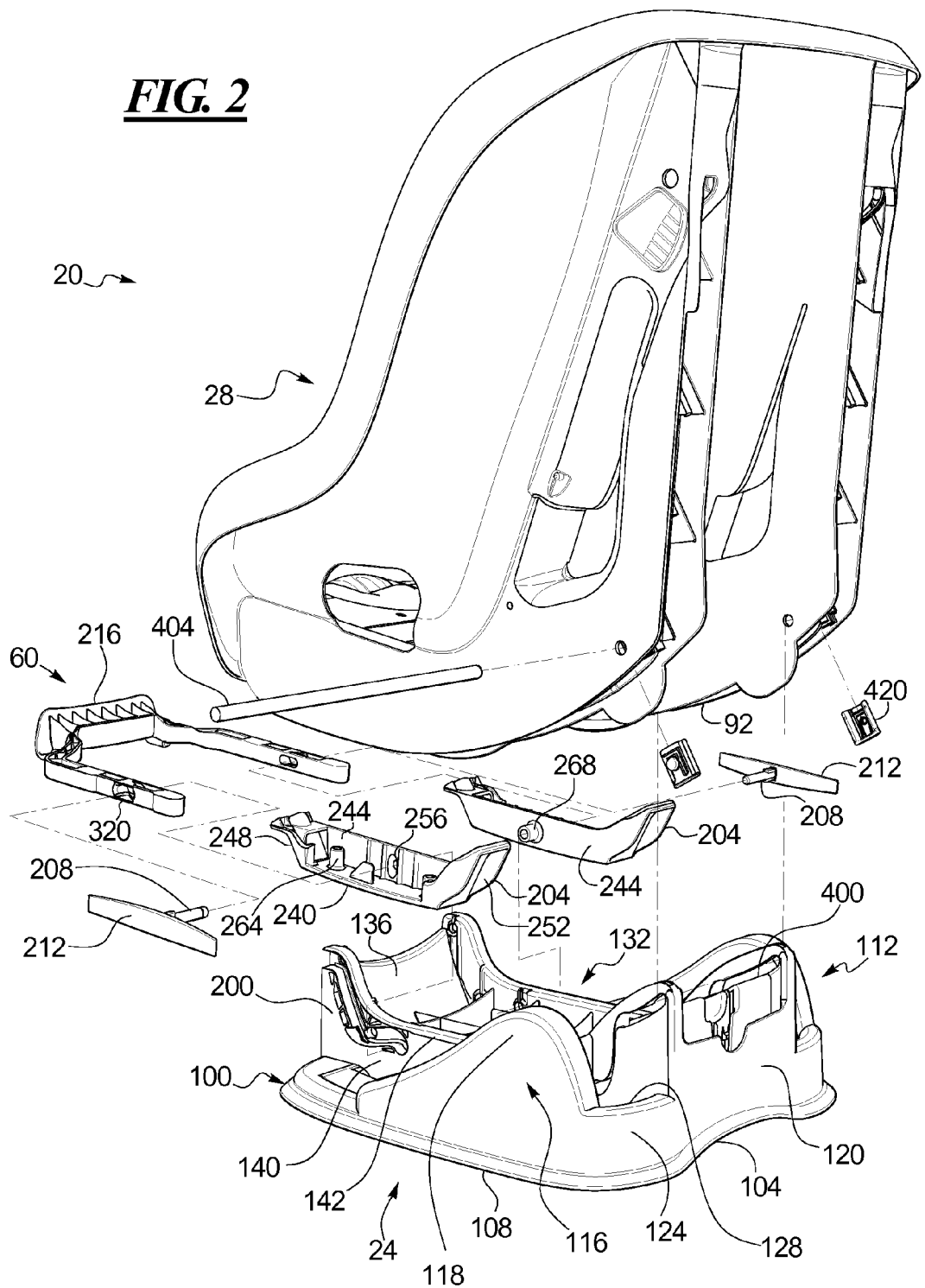
FIG. 2 shows a perspective and exploded rear view of the car seat in FIG. 1.

Turning now to the drawings, FIG. 1 illustrates a reclinable child seat assembly or car seat 20 constructed in accordance with the teachings of the present invention. The car seat 20 generally includes a support base 24 and a seat shell 28 coupled to and supported on the support base 24. Though not specifically depicted herein, the support base 24 is configured to rest on a dedicated seat of a vehicle (e.g., a car, truck, minivan, etc.) To that end, the support base 24 includes a bottom or underside configured to rest on the dedicated seat of the vehicle. With reference to FIGS. 1 and 2, the support base 24 also includes a top side 32 configured to engage at least a portion of the seat shell 28 when the base and the seat shell are coupled together. The seat shell 28 has a top or front side 36 and a bottom or underside 40 (see FIG. 2) configured to engage at least a portion of the top side 32 of the support base 24 when the base and the seat shell are coupled together. The seat shell 28 further defines a seat bottom 44 and a seat back 48 on the top or front side 36. The seat bottom 44 has a generally upward facing seat bottom surface 52 to support the child's derriere and legs during use. The seat back 48 has a generally forward facing seat back surface 56 to support a child's back during use. Together, the seat bottom surface 52 and seat back surface 56 define a seating surface on the top or front side 36 of the seat shell 28.

The car seat 20 further includes a recline mechanism 60 that is generally configured to selectively permit or allow movement or adjustment of the seat shell 28 relative to the support base 24 between two or more recline positions. In the disclosed example, the seat shell 28 can be adjusted, relative to the support base 24, between a first recline position, a second recline position different from the first recline position, and a third recline position different from the first and second recline positions as described below in further detail. In another example, the seat shell 28 may only be adjustable, relative to the support base 24 between a first recline position and a second recline position. In other examples, the seat shell 28 may be adjustable between more than three different recline positions (e.g., 4, 5, 6, etc., recline positions). The recline mechanism 60 and its components can be coupled, attached, mounted, carried on, or otherwise connected to the support base 24 and/or the seat shell 28 in any number of different ways.

A typical car seat generally has a number of additional components and elements. As shown in FIG. 1, the car seat 20 in this example further includes a cup holder 64, a pair of armrests 68, and a harness latch 72. The car seat 20, however, need not include these components and/or can include other additional components and elements not shown in the illustrations presented herein. For example, the car seat 20 might include a seat harness, anchor straps, a crotch belt, and soft goods covering at least the seating surface of the shell 28. These elements have no bearing on the scope and spirit of the present invention and are thus not disclosed or described herein. In addition, the disclosed car seat 20 represents one of many possible alternate car seat examples for which the disclosed invention may be well suited. As a result, the car seat 20 can vary from that disclosed and described herein and yet fall within the spirit and scope of the present invention. These variations can include size, shape and contour, component construction, material usage, manufacturing processes, and the like. The shell 28 in the disclosed example is a plastic molded structure that may be assembled from several plastic or other sub-components to create the car seat, as is known in the art. In other examples, the shell 28 may be constructed differently. These and other features of the car seat 20 can vary within the spirit and scope of the present invention.

FIG. 2 shows an exploded view of the car seat 20 including the support base 24, the seat shell 28, and the components or parts of the recline mechanism 60. As shown in FIG. 2, the seat shell 28 includes a pair of rails 92 positioned along or on the bottom or underside 40 of the seat shell. As shown in FIG. 2, the support base 24 has a lower boundary or perimeter edge formed or defined by a front edge 100, a rear edge 104, and side edges 108 between the front edge and the rear edge. The support base 24 includes a perimeter or outer wall 112 that extends or projects upward from the lower perimeter edge and front-to-back along a portion of each of the side edges 108 and laterally along the rear edge 104. The perimeter wall 112 thus has two side sections 116 with a curved top end 118 and a rear wall section 120. The side wall sections 116 extend upwards from the lower perimeter side edges 108. As shown in FIG. 2, the curved top ends 118 extend further and further upwards (i.e., the curved portions 116 have a height that increases) moving rearward along the side edges 108 toward the rear edge 104. The rear wall section 120 is between the side wall sections 116 and extends upward from the rear edge 104. A corner portion 124 of the rear wall section 120 is adjacent each of the side wall 116 and is shorter than (i.e., does not extend upward as much as) the central part of the rear wall section 120. A channel 128 is thus formed between the rear wall section 120 and each of the side wall sections 116. Though not specifically depicted herein, the channels 128 extend forward from the corner portions 124 to the front edge 100 of the support base 24. A substantial majority of the channels 128 has a depth nearly down to a plane of the lower boundary of the base 24. The channels 128 are sized and configured to receive the rails 92 positioned on the bottom or underside 40 of the seat shell 28 when the seat shell is mounted on or coupled to the top side 32 of the support base 24. When the rails 92 are received in the channels 128, the underside or bottom 40 of the seat shell 28 is closely adjacent or proximate to the top side 32 of the support base 24 near the level or elevation of the boundary.

The support base 24 further includes a box structure 132 mounted to, coupled to, attached to, or formed as an integral part of the top side 32 within the perimeter wall 112. The box structure 132 includes a front wall 136 and side walls 140. The front wall 136 extends or projects upward from the top side 32 and extends laterally over the front edge 100. The side walls 140 extend or project upwards and are spaced inward relative to the side wall section 116. Each of the side walls 140 is joined to the front wall 132, as shown in FIG. 2 and extends rearward from the front wall 136. Each side wall has an upper edge 142 that curves downward from an upper edge of the front wall 136 and then curves upward and transition into the a rear wall section 120. Each side wall 140 is joined to the rear wall near the base rear wall section 120. The majority of the height of the side wall 140 is thus shorter than that of the front wall 136 or rear wall section 120. The spacing or placement of the side wall sections 116 relative to the side walls 140 creates or forms the channels 128 on the support base 24. The rails 92 have a width sized to seat in the channels 128.

In other examples, the support base 24, and, more specifically, the perimeter wall 112 and the box structure 132, may vary considerably, or be eliminated, on a car seat within the spirit and scope of the present invention. For example, the shape, size, orientation, and/or positioning of the side wall sections 116, the rear wall section 120, and/or the corner wall portions 124 of the perimeter wall 112 may vary. Likewise, the shape, size, orientation, and/or positioning of the front wall 136 and the side walls 140 of the box structure 132 may vary. In one example, the height of each of the side walls 140 may vary or be constant.

The components of the recline mechanism 60 are as shown in FIG. 2. The recline mechanism 60 generally includes a recline positioner 200, a recline housing 204, a pin 208, a biasing element 212, and a release handle 216. In the disclosed example, the recline mechanism 60 includes two of the recline positioners 200, two of the recline housings 204, two of the pins 208, and two of the biasing elements 212 each operable by the release handle 216. The recline positioners 200 are laterally spaced apart across the car seat 20 as shown in FIG. 2. In this example, each biasing element 212 and pin 208 is integrally formed as a one-piece component, but could be formed as a multi-part assembly. In other examples, the recline mechanism 60 can include one of each of these components or can include more than two of these components, and/or the recline mechanism 60 can include additional, fewer, or different components.

The recline positioner 200 is generally carried on or mounted to part of the car seat 20 and has at least a first portion that defines or corresponds to one recline position of the seat shell 28 and a second portion that defines or corresponds to another, different recline position of the seat shell 28. The recline positioner 200 can also have three or more portions that define or correspond to additional recline positions of the seat shell 28.

Figure 3:
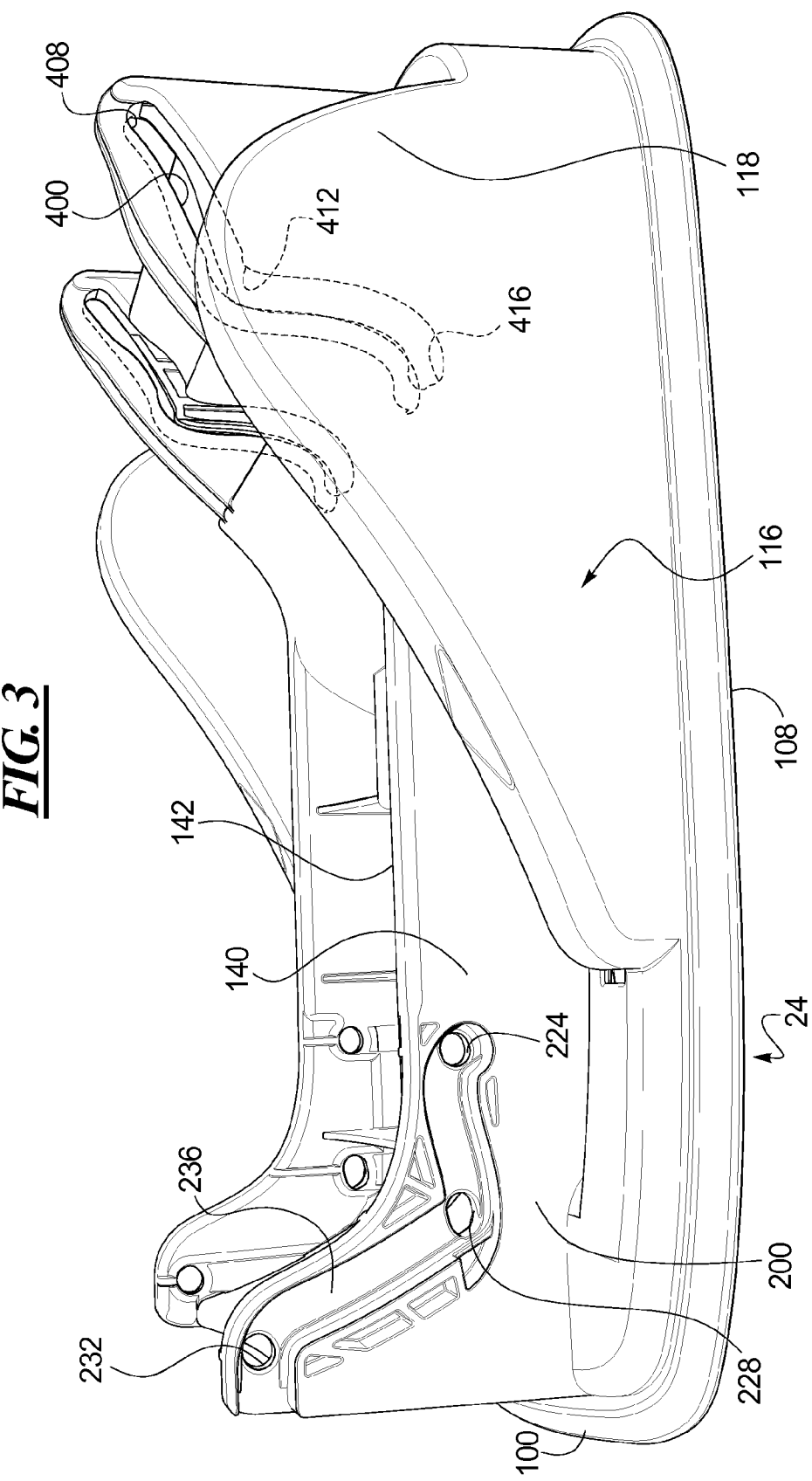
FIG. 3 shows a side view of the support base of the car seat in FIG. 1.

With reference to FIG. 3, the recline positioners 200 in the disclosed example are on the support base 24, and, specifically, provided on the side walls 140 of the box structure 132. Each recline positioner 200 has a first portion, a second portion, and a third portion. The first portion of each positioner 200 is a first aperture 224 that is on and extends laterally through the side wall 140. The second portion of each positioner 200 is a second aperture 228 that is on and extends laterally through the side wall 140 and spaced forward and only slightly downward relative to the first operative 224. The third portion of the positioner 200 is a third aperture 232 that is on and extends laterally through the side wall 140 nearer still to the front edge 100. In the disclosed example, the third aperture 232 is located or positioned at a higher elevation than the first and second apertures 224, 228 (which are located or positioned at approximately the same elevation). The recline positioner 200 in this example further includes a generally curved and recessed track 236 that is recessed into the side wall 140 and extends between the first, second, and third apertures 224, 228, and 232. As shown in FIG. 3, the shape of the tracks 236 is at least partially defined by or mirrored by the curvature of part of the upper edge 142 of the side walls 140.

In other examples, the recline positioner 200 can be on the seat shell 28. The first, second, and/or third portions of the recline positioner 200 can also be arranged differently on or in the support base 24. Moreover, the first, second, and/or third portions of the positioner 200 can be notches, recesses, openings, grooves, or the like, instead of the first, second, and/or third apertures 224, 228, 232 as disclosed herein. The track 236 can instead be a different size and/or shape and/or the recline positioner 200 can include a slot, channel, trough, or the like, instead of the track 236.

With reference again to FIG. 2, each recline housing 204 in the disclosed example includes a bottom panel 240, an upstanding inner panel 244 that extends upward from the bottom panel 240, a front panel 248, and a rear panel 252. Each housing 204 has an open top and open outer side in this example. The inward upstanding panel 244 includes a generally circular aperture 256 positioned or located at a center or mid-portion of the panel. The front panel 248 is coupled to and extends forward and upward from the bottom panel 240 and is coupled to and bounded by the inner upstanding panel 244. The rear panel 252 is coupled to and extends rearward and upward from the bottom panel 240 and is coupled to and, like the front section 248, bounded by the inner upstanding panel 244. The recline housing 204 also includes a pair of cylindrical bosses 264 that each project or extend upward from the bottom panel 240. One cylindrical boss 264 is positioned near or proximate the front panel 248, while the other boss 264 is positioned near or proximate the rear panel 252. As shown in FIG. 2, the recline housing 204 further includes a hollow boss 268 that projects or extends inward from inner upstanding panel the 244. The hollow boss 268 is centrally open and aligned with, and thus partly defines, the aperture 256.

Figure 4:
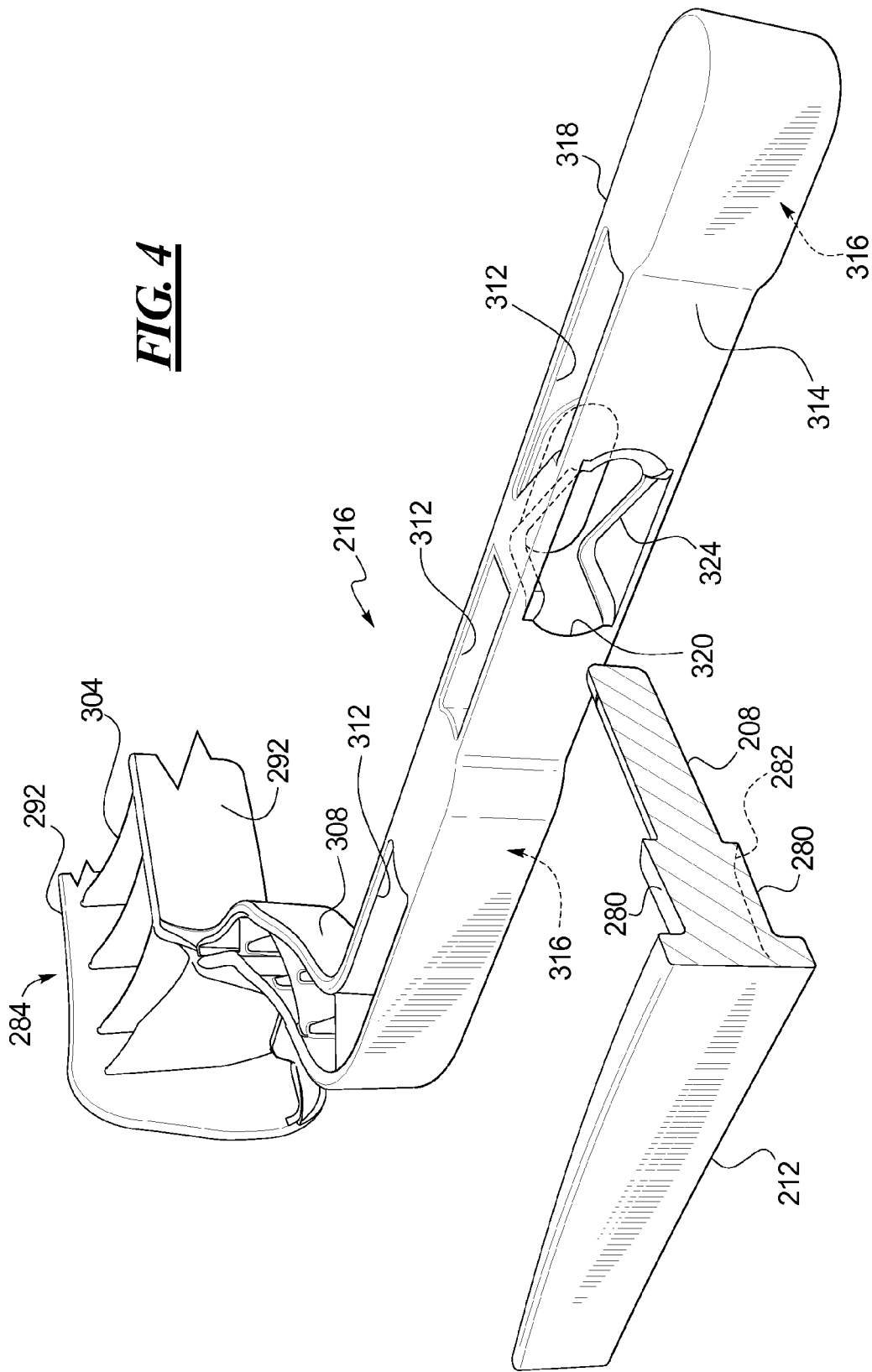
FIG. 4 shows a partial cross-section and cut-away view of part of a recline mechanism for the car seat in FIG. 1.

With reference to FIGS. 2 and 4, each pin 208 is coupled to and protrudes and extends horizontally inward from the biasing element 212. More specifically, each pin 208 in this example protrudes and extends horizontally inward from a mid-portion (e.g., the center) of the respective biasing element 212. In the disclosed example, the biasing elements 212 are leaf springs, but in other examples the biasing elements 212 can be any other type of spring (e.g., a coil spring) or flexible element. As shown in FIGS. 2 and 4, each biasing element 212 extends lengthwise along the car seat 20 and has a slightly curved shape. More particularly, each biasing element 212 is curved such that the biasing element has a concave shape on the side opposite the pin 208. In other examples, the biasing element 212 can be flat, have a convex shape, or have a different shape, and/or be arranged differently relative to the car seat 20.

The disclosed recline mechanism 60 includes one or more protrusions coupled to or part of (i.e., integral with) each pin 208 and/or biasing element 212. In the disclosed example, the recline mechanism 60 includes two protrusions 280 on opposite sides of each pin 208 on the biasing element 212. The protrusions 280 are formed as radially oversized or larger diameter portions at the base of each pin 208. In other examples, the recline mechanism 60 can include one protrusion 280 or more than two protrusions 280. In one example, the base of the pins 208 can be wider in diameter and form a shoulder facing toward the free end of each pin. In any event, the protrusions 280 form contact surfaces 282 that face inward from the biasing element 212 and protrude radially outward from the pin 208. In the disclosed example, each contact surface 282 can have a curved, angled, or non-flat shape when viewed from the side of the pin 208. In other examples, each contact surface 282 can be flat (i.e., not have a curved or angled shape) and/or can have a different size and/or shape than the contact surfaces in the disclosed example.

FIGS. 2 and 4 also show one side of the release handle 216 of the recline mechanism 60. In the disclosed example, the release handle 216 includes an actuator or grip 284 and two arms 288 coupled to and extending rearward from the actuator 284. The actuator 284 is oriented laterally relative to the car seat 20 (i.e., it is parallel to the front wall 136). The actuator 284 includes a front surface or side 292 and a rear surface or side 292 spaced apart from one another and a bottom surface (not shown). The surfaces 292 and the bottom surface form a substantially hollow interior and an open top. The actuator 284 further includes a plurality of ribs 304 between the front, rear, and bottom surfaces within the interior space to add rigidity to the actuator.

Each arm 288 is coupled to a respective side of the actuator 284 by an extension 308 that spaces the arms further apart than a width of the actuator 284. The arms 288 extend rearward from the extensions 308, respectively. Each arm 288 has an outer closed face 314 and an inner closed face 318. As is best shown in FIG. 4, each arm 288 includes a plurality of slots 312 formed into a top of the arm between the faces 314, 318 (i.e., the slots are open to the top of the arm) and a plurality of slots 316 formed into a bottom of the arm between the faces 314, 318 (i.e., the voids or grooves are open to the bottom of the arm). An oval-shaped recess or slot 320 (hereinafter "slot") is formed into and through both faces 314, 318 of each arm 288. Each arm 288 generally provides one or more driving ramps 324 within the slot 320. In this example, a driving ramp 324 is disposed above and below the slot 320 in each arm 288. In the disclosed example, each arm 288 has two of the driving ramps 324 along the slot 320, with one driving ramp 324 provided below the slot 320 and one driving ramp 324 provided above a top of the slot 320. The driving ramps 324 in this example are positioned in the slots 320 and become progressively deeper into the slots moving further rearward. In other examples, each arm 288 can define only one driving ramp 324 within the slot 320, more than two driving ramps 324 within the slot 320, or one or more driving ramps 324 in a different location (e.g., not within the slot 320). Moreover, the driving ramps 324 can have a different size and/or shape and/or be arranged differently relative to the slot 320. As discussed in detail below, the ramps 324 are provided to engage the contact surfaces 282 to move the pins 208. Thus, the ramps 324 and contact surfaces 282 need only cooperate with one another and thus both can be moved or altered with the scope of the invention.

As will be evident to those having ordinary skill in the art, the recline mechanism 60, and the components of the recline mechanism—the recline positioners 200, the pins 208, the biasing elements 212, the release handle 216—can vary, be eliminated, be combined, and/or be arranged differently relative to one another and/or the car seat within the spirit and scope of the present invention.

Figure 5:
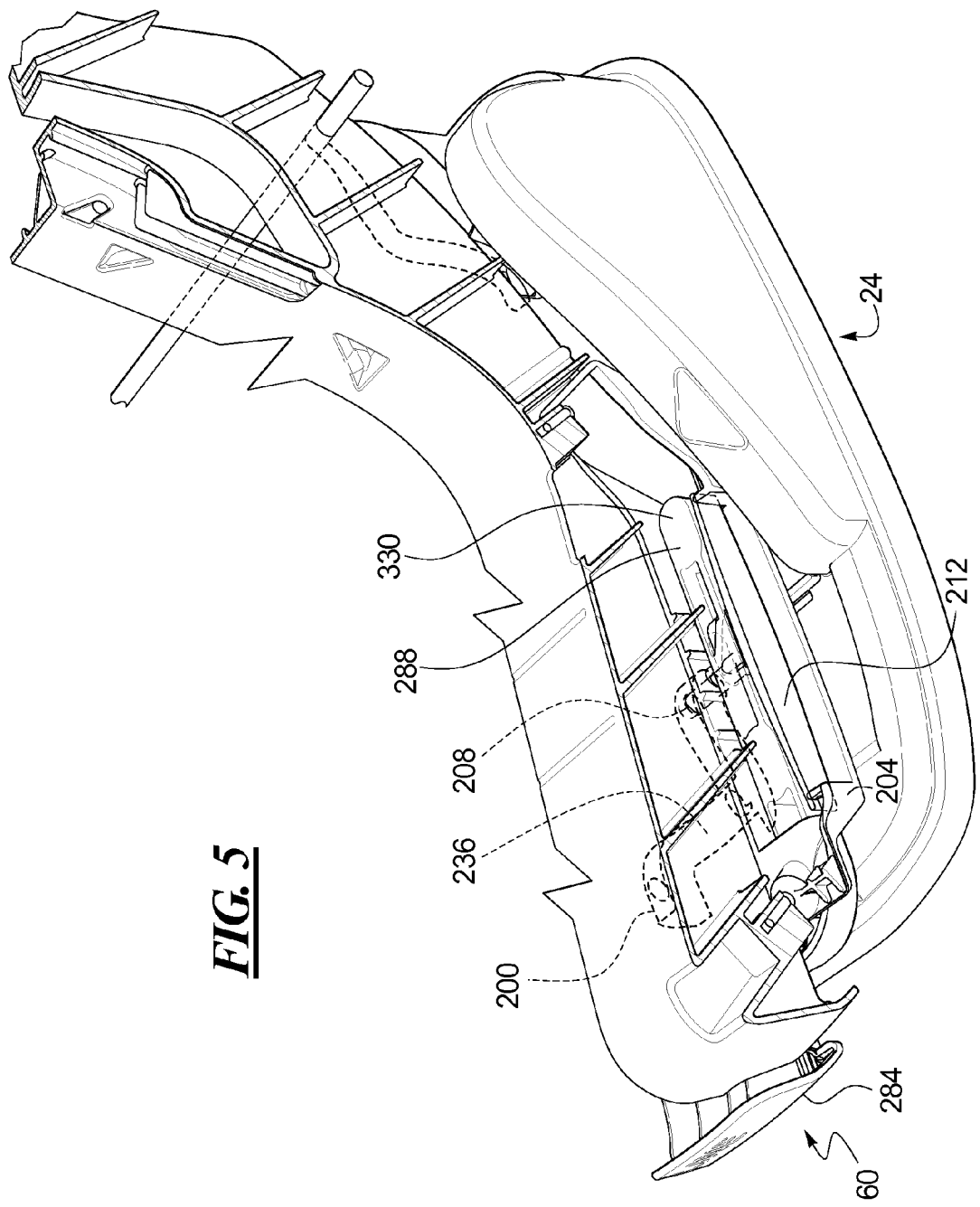
FIG. 5 shows a partial cut-away view perspective of the car seat in FIG. 1.
Figure 6:
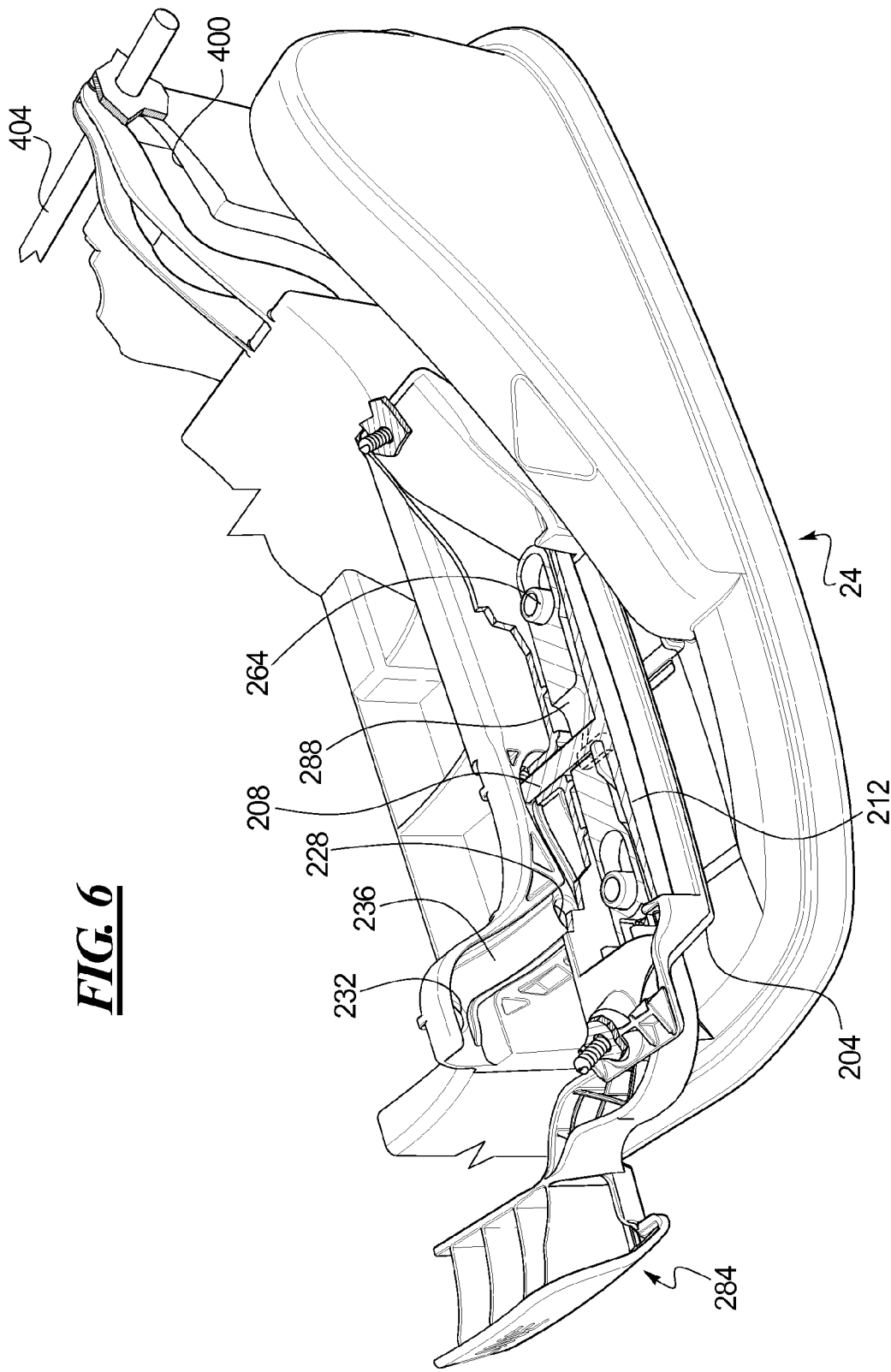
FIG. 6 shows a partial cut-away view perspective of the car seat in FIG. 1 and with a recline mechanism in an engaged configuration.

FIGS. 5 and 6 depict the components of the recline mechanism 60, as assembled, when the car seat 20 is in the first recline position. Though not specifically depicted herein, in the disclosed example, the recline housings 204 are mounted to the seat shell 28 in any suitable manner (e.g., via snap fit fasteners, screws, or the like) beneath the seating surface and adjacent to the recline positioner 200. As shown in FIG. 5, the actuator 284 is positioned or located along the front edge of the seat bottom 44 and the arms 288 are seated or positioned within the recline housing 204. The arms 288 thus extend through openings in the front panels 248 of the housings 204. When positioned within the recline housings 204, the recline arms 288 extend rearward from the extensions 308, through the front panels 248. Free ends 330 of the arms 288 are proximate or close to the rear panel 252 of the recline housing 204. The cylindrical bosses 264 are seated in and slidable within the voids or grooves 316 in the arm 288 (see FIG. 8), and the hollow bosses 268 of the housings 204 extend through the arm slots 320. The pins 208 and the biasing elements 212 are mounted within the recline housings 204. The pins 208 extend completely through the hollow bosses 268 of the housings 204 and also through the arm slots 320.

Figure 7:
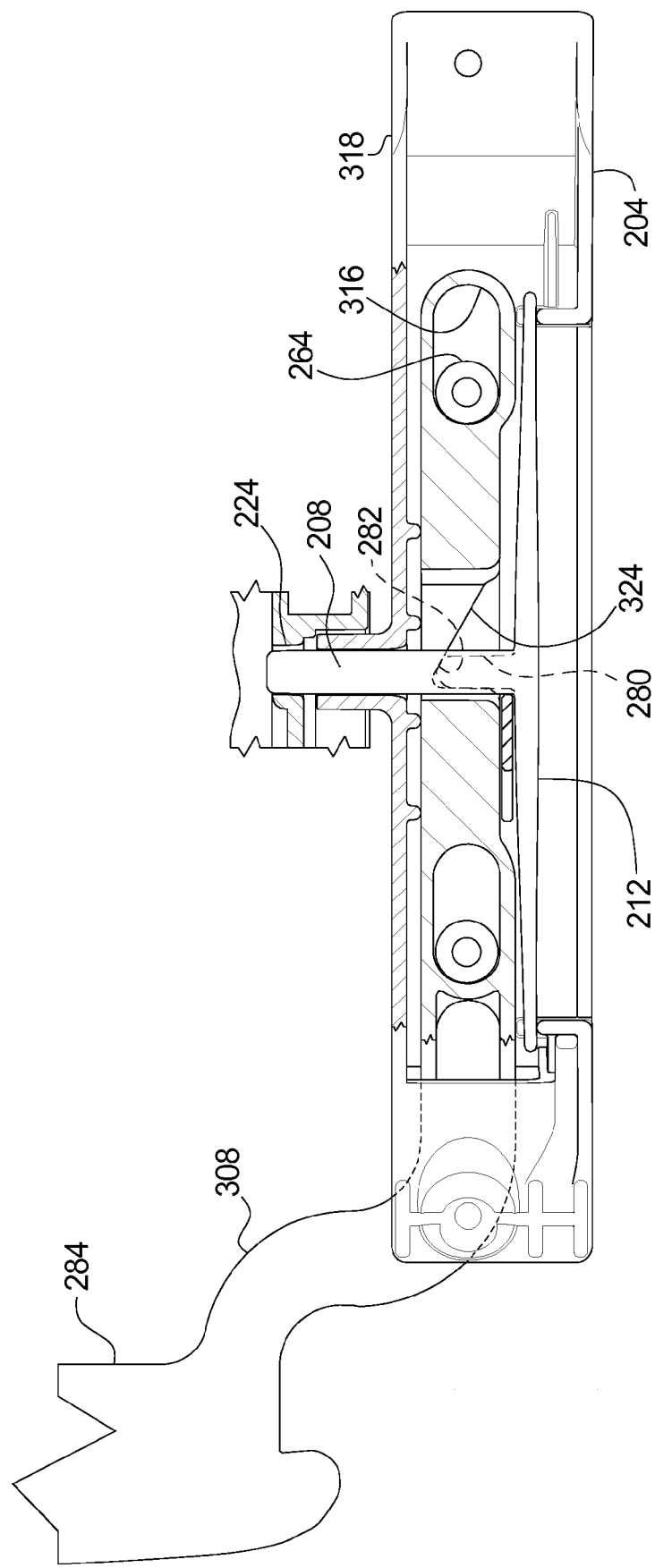
FIG. 7 shows a top cross-section and cut-away view of portions of the recline mechanism in FIG. 6.

As shown in FIGS. 5-7, the pins 208 extend inward through the recline housing 204, and, more specifically, the hollow bosses 268, and are aligned or co-axial with, and thus engage, the first apertures 224 of the recline positioners 200 (i.e., the pins 208 are in an engaged position). As shown in FIG. 7, the contact surfaces 282, which are located or positioned facing the slots 320, engage or are seated against the forward-most portion (i.e., the deepest part) of the driving ramps 324 within the slots 320. The biasing elements 212 are positioned outward of the arms 288 within the recline housings 204, as shown in FIG. 5. As shown in FIG. 6, free ends of each biasing element 212 are borne against or fixed to the respective recline housing 204. The biasing elements 212 are configured to bias the pins 208 inward to the engaged position (i.e., the biasing elements 212 biases the pins 208 into the first aperture 224 in the first recline position). In turn, the pins 208 and the biasing elements 212 serve to retain or latch the seat shell 28 in the first recline position. As will be described in greater detail below, the pins 208 are also configured to engage the second aperture 228 or the third aperture 232, respectively, of the recline positioners 200, instead of the first aperture 224.

With reference to FIGS. 2, 3, and 8, the car seat 20 further includes one or more guide slots 400 and a guide bar 404 that move relative to one another when the seat shell 28 is moved between the first, second, and third recline positions. The one or more guide slots 400 can be located either on the support base 24 or the seat shell 28 and the guide bar 404 can be carried on or coupled or attached to the other of the support base 24 or the seat shell 28. The one or more guide slots 400 generally define or match the number of recline positions of the seat. For example, the guide slots can define a first slot position 408 corresponding to the first recline position of the seat shell 28 and a second slot position 412 corresponding to the second recline position of the seat shell 28. Movement of the guide bar 404 is generally guided by the one or more guide slots 400 and is generally configured to slide or move between the slot positions defined by the guide slot or slots.

In the disclosed example, the car seat 20 has two of the guide slots 400 on or in the support base 24 and laterally spaced apart from one another. The car sear 20 also has one guide bar 404 carried on the seat shell 28. Each guide slot 400 is, in the disclosed example, a somewhat S-shaped slot formed laterally through the side wall section 116 of the perimeter wall 112 and side walls 140, of the box structure 132 and near the rear wall 120. Each guide slot 400 is thus open horizontally across the support base 24 and aligned with the other guide slot. Each guide slot 400 in this example defines the first slot position 408, the second slot position 412, and a third slot position 416 corresponding to the third recline position of the seat shell 28. The guide bar 404 in the disclosed example is an elongate metal rod or cross-bar. Each end of the guide bar 404 is fixedly attached to the respective side section 116 of the seat shell 28 via a fastener or clip 420. As shown in FIG. 6, the guide bar 404 extends laterally through and is slideable within or along the guide slots 400 as the seat shell 28 moves.

In another example, the one or more guide slots 400 can be on or in the seat shell 28, while the guide bar 404 can be carried by, attached to, or otherwise coupled to the support base 24. In other examples, the one or more guide slots 400 can be located on or in a different position on the support base 24 (e.g., on the panel 136), such as having a single, central guide slot. The guide bar 404 can be coupled to the seat shell 28 in a different way and/or in a different place, and/or the one or more guide slots 400 and the guide bar 404 can be arranged or oriented differently. For example, the one or more guide slots 400 can be open vertically on the support base 24, in which case the guide bar 404 can extend vertically through or into the guide slot. In other examples, the one or more guide slots 400 can have a different size and/or shape (e.g., not S-shaped), can define only two slot positions or more than three slot positions, and/or can be a track, blind or closed track, channel recess, or the like instead of an open through-slot.

As noted above, the recline mechanism 60 is configured to selectively permit adjustment of the seat shell 28 relative to the support base 24 between first second, and third recline positions.

FIG. 9, shows the seat shell in the first recline position. A back side of the seat shell 28 is generally upright (i.e., somewhat perpendicular to the bottom of the support base), the seat bottom surface 52 has a first angle $\theta_{1A}$ relative to the horizontal, and the seat back surface 56 has a first angle $\theta_{1B}$ relative to the vertical. In the disclosed example, the first angle $\theta_{1A}$ is between about 0 and 15 degrees, and the second angle $\theta_{1B}$ is between about 15 and 30 degrees. In other examples, the car seat can be configured to orient the seat shell at other angles in a first or most upright orientation.

Reference is again made to FIGS. 6 and 7, which illustrate the components of the recline mechanism 60 in an engaged configuration and the guide bar 404 in the first slot position when the seat shell 28 is in the first recline position. As shown in FIG. 6, the guide bar 404 is located in the first slot position 408 of each guide slot 400 and the pins 208 are in the engaged position within the first apertures 224. In other words, the pins 208 extend or protrude inward from the biasing elements 212, though the recline housings 204, and into the first apertures 224 of the recline positioner 200. The biasing elements 212 bias the pins 208 to this engaged position. The pins 208 secure or latch the seat shell 28 in the first recline position. As shown in FIG. 7, the contact surfaces 282 are seated against the forward-most portion of the driving ramps 324 (i.e., the deepest portion of the driving ramps 324 having the smallest width).

Figure 10:
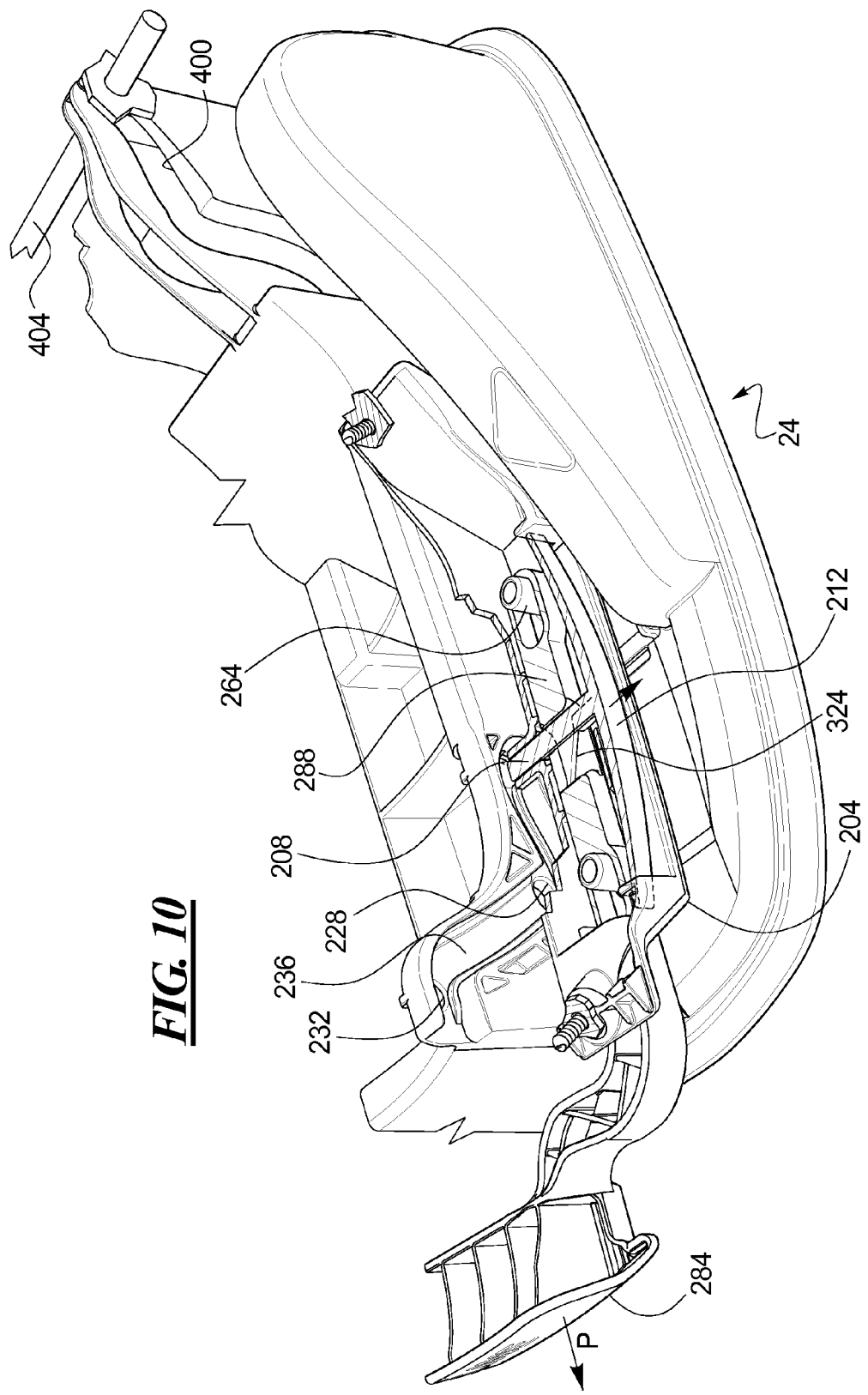
FIG. 10 shows the recline mechanism in FIG. 6 but with the recline mechanism in a released configuration.
Figure 11:
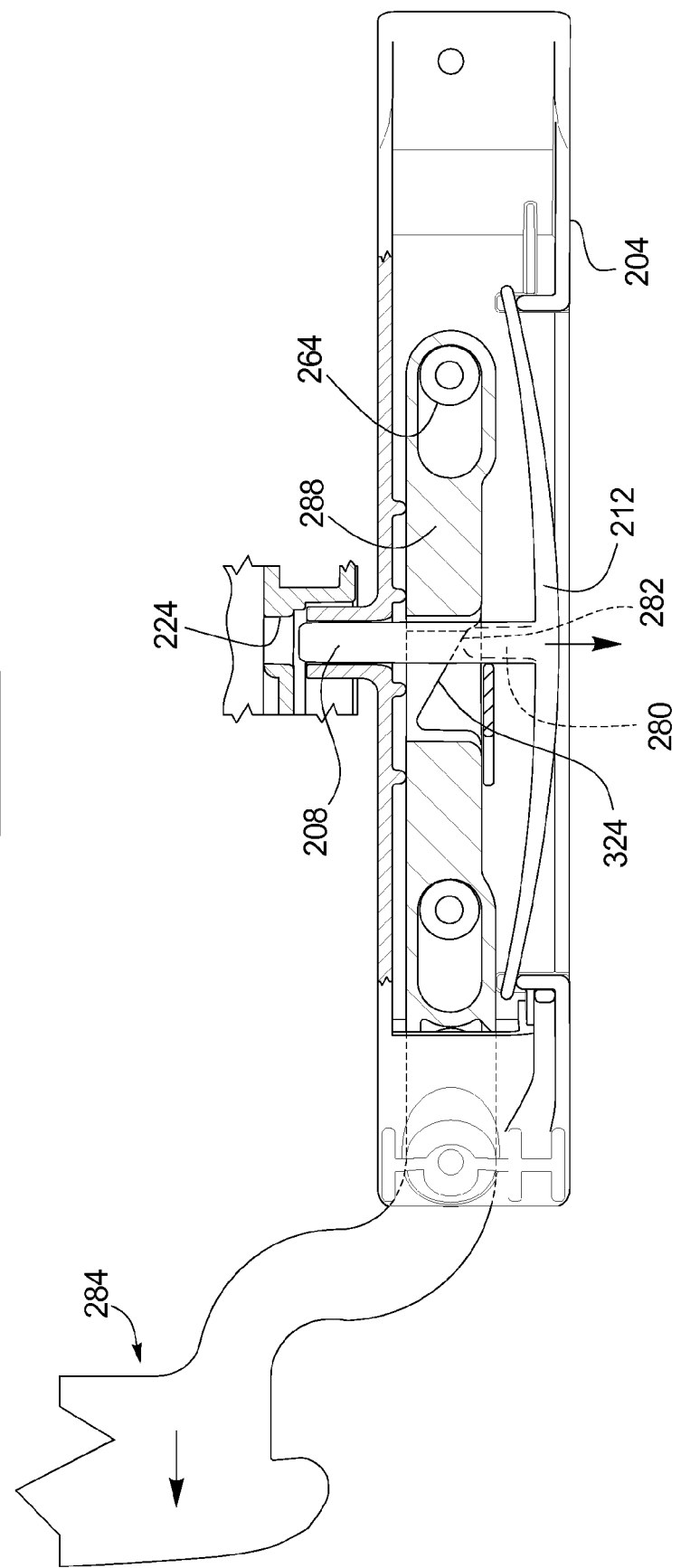
FIG. 11 shows the recline mechanism in FIG. 7 but in the released configuration.

When a user wishes to move the seat shell 28 from the first recline position to the second recline position or the third recline position, the release handle 216 is operable to move the pins 208 from the engaged position to a released position out of engagement with the first apertures 224 of the recline positioners 200. When the actuator 284 of the handle 216 is pulled or otherwise moved forward as depicted by the arrow P in FIG. 10, the arms 288 of the handle 216 are also pulled or moved forward. The slots 316 of the arm 288 move or slide forward relative to the cylindrical bosses 264. The driving ramps 324 of the arm 288 are also pulled or moved forward as well as shown in FIG. 11. As the driving ramps 324 move forward, the driving ramps drive the pins 208 outward from the engaged position to the released position. More specifically, as the driving ramps 324 move forward, the driving ramps 324 push, drive, or move the protrusions 280 and the contact surfaces 282 outward and, thus, the pins 208 move outward as well until the pins 208 are moved or driven out of the first apertures 224 (see FIG. 11). In other words, pulling the release handle 216, particularly the actuator 284 and the arms 288, moves forward the driving ramps 324 and the contact surfaces 282 relative to one another to move the pins 208 out of the engaged position to the released position.

Figure 12:
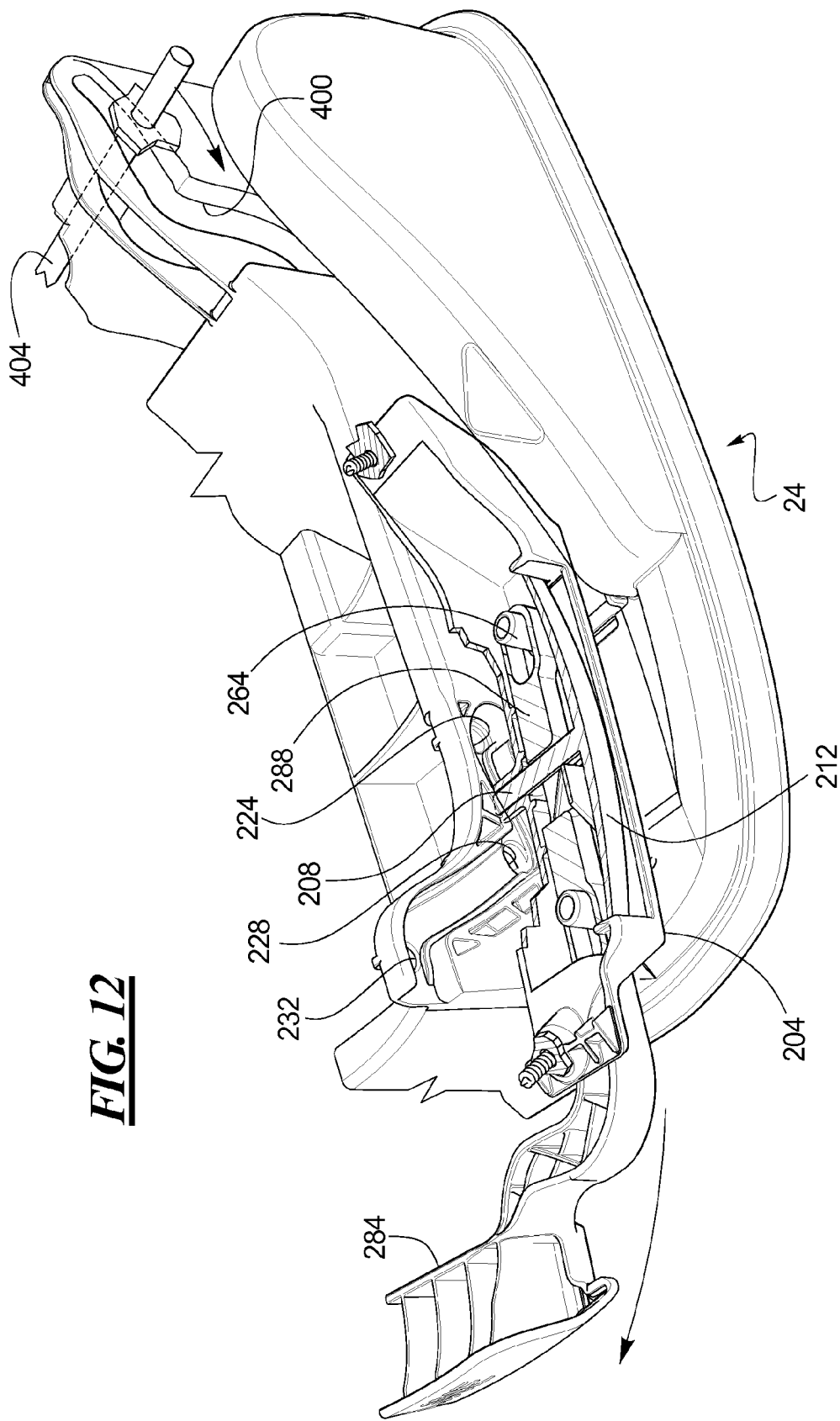
FIG. 12 shows the car seat and recline mechanism in FIGS. 10 and 11 and with the seat shell moved from the first recline position of FIG. 9 toward another position.

With the pins 208 in the released position (i.e., retracted from the first apertures 224), as shown in FIG. 12, the pins 208 are free to move or slide along or within the recline positioner 200. In the disclosed example, the pins 208 can slide along the tracks 236. The seat shell 28 is, in turn, free to move from the first recline position (FIG. 9) to the second recline position as shown in FIG. 13 or the third recline position as shown in FIG. 14. As the seat shell 28 is moved from the first recline position toward the second or third recline position, the guide bar 404 slides along the guide slots 400 from the first slot position 408 toward the second slot position 412 or the third slot position 416 and the pins slide along the track from the first apertures 224 toward the second or third apertures 228, 232.

When the user moves the seat shell 28 from the first recline position to the second recline position (FIG. 13), the seat shell 28, and, more particularly, the pins 208, move or slide forward along the track 236. When the pins 208 are not aligned with the first apertures 224, the release actuator 284 can be let go or released. The free ends of the pins 208 will bear against and are free to slide along surfaces of the tracks 236. When the pins are adjacent or aligned with the second apertures 228, the biasing elements 212 will force or fire the pins 208 inward into engagement with the second apertures 228. The contact surfaces 282 will thus move or slide forward against or along the driving ramps 324 until the surfaces are seated against the forward-most portion of the driving ramps. The arms 288 are, in turn, pulled rearward. As the seat shell 28 is moved, the guide bar 404 will also slide to the second slot position 412 simultaneously with movement of the seat shell 28 from the first recline position to the second recline position.

As shown in FIG. 13, in the second recline position, the seat shell 28 is positioned downward and forward relative to the first recline position. In turn, the back side of the seat shell 28 is less upright than when in the first recline position. The seat bottom surface 52 has a second angle $\theta_{2A}$ relative to the horizontal, the second angle $\theta_{2A}$ being larger than the first angle $\theta_{1A}$. The seat back surface 56 has a second angle $\theta_{2B}$ relative to the vertical, the second angle $\theta_{2B}$ being larger than the first angle $\theta_{1A}$. In the disclosed example, the second angle $\theta_{2A}$ is between about 15 and 30 degrees, and the second angle $\theta_{2A}$ is between about 30 and 45 degrees. In other examples, the seat shell can be oriented at a different orientation in a second or intermediate recline position than in this example.

To move the seat shell 28 from the second recline position to the third recline position (or back to the first recline position), a similar process can be followed. The release handle 216 is operable to move the pins 208 from the engaged position to the released position out of engagement with the second apertures 228. When the actuator 284 of the handle 216 is pulled or otherwise moved forward (see FIG. 10), the arms 288 of the handle 216 are also pulled or moved forward and the slots 316 of the arms 288 move or slide forward relative to the cylindrical bosses 264. The driving ramps 324 of the arms 288 are pulled or moved forward as well. The driving ramps 324 will move the pins 208 outward from the engaged position to the released position out of the second apertures 228 (see FIG. 11).

When the user wishes to move the seat shell 28 from the first recline position directly to the third recline position (FIG. 14), the user may continue to hold (i.e., not let go or release) the release actuator 284. This prevents the biasing elements 212 from driving or forcing the pins 208 inward into engagement with the second apertures 228, and, thus permits the pins 208 to bypass, instead of firing into, the second apertures 228, as the pins 208 slide along surfaces of the tracks 236 between the first apertures 224 and the third apertures 232. After the pins 208 bypass the second apertures 228 or are aligned or adjacent with the third apertures 232, the release actuator 284 can be released or let go. The seat shell 28 can then be retained or latched in the third recline position in a manner similar as is described above. The seat shell 28 can be moved between the first, second, and third recline positions as desired.

As shown in FIG. 14, in the third recline position, the seat shell 28 is positioned further downward and forward relative to the first and second recline positions. In turn, the back side of the seat shell 28 is substantially angled relative to vertical The seat bottom surface 52 has a third angle $\theta_{3A}$ relative to the horizontal, the third angle being larger than the first and second angles $\theta_{1A}$, $\theta_{2A}$. The seat back surface 56 has a third angle $\theta_{3B}$ relative to the vertical, the third angle being larger than the first and second angles $\theta_{1B}$, $\theta_{2B}$. In the disclosed example, the third angle $\theta_{3A}$ is approximately 45 degrees, and the third angle $\theta_{3B}$ is between about 45 and 60 degrees. In other examples, the seat shell can be orientated at different angles when in a third or most reclined position then in this example. In the third recline position, the guide bar 404 is positioned in the third slot position 416 of each guide slot 400 and the pins 208 engage the third apertures 232 and thus secure or latch the seat shell 28 in the third recline position.

The disclosed low profile base and seat shell structure is created by the deep channels in the base and the seat rails (and spaces there between) under the seat shell. Thus, the seat shell, and the seating surface, rest lower on the base than prior art car seats. The disclosed recline mechanism utilizes apertures, tracks, slots, and the like formed through and/or into the surfaces of the channels. The mechanism also utilizes components mounted to the underside of the seat that do not interfere with the channels. The seat shell can therefore sit very low on the support base, lowering the center-of-gravity of the car seat and seat occupant. At the same time, the robust and unique recline mechanism provides the car seat with a recline adjustment feature.

Although certain car seats, features, functions, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A reclinable child seat assembly comprising:
  a support base configured to rest on a dedicated seat of a vehicle;
  a seat shell defining a seat back, a seat bottom, and a seating surface and being supported on the support base; and
  a recline mechanism configured to selectively permit adjustment of the seat shell relative to the support base between a first recline position and a second recline position different than the first recline position, the recline mechanism including
    (a) a recline positioner having a first portion defining the first recline position and a second portion defining the second recline position,
    (b) a pin movable between a released position and an engaged position and configured to engage, in the engaged position, a selected one of the first and second portions of the recline positioner to retain the seat shell in the corresponding first or second recline position,
    (c) a leaf spring coupled to the pin and configured to bias the pin to the engaged position, and
    (d) a release handle operable to move the pin from the engaged position to the released position out of engagement with the first and second portions of the recline positioner,
  wherein, when the pin is in the released position, the seat shell is movable between the first recline position and the second recline position.

2. The reclinable child seat assembly of claim 1, wherein the recline positioner includes a track extending between the first and second portions, and wherein the first portion is a first aperture and the second portion is a second aperture.

3. The reclinable child seat assembly of claim 1, wherein the pin is protruding from the leaf spring.

4. The reclinable child seat assembly of claim 1, wherein the release handle has an actuator positioned along a front edge of the seat bottom of the seat shell and an arm extending rearward from the actuator.

5. The reclinable child seat assembly of claim 4, wherein the pin has a contact surface and the arm has a driving ramp engaging the contact surface, and wherein the release handle is operable to move the arm and the driving ramp to move the pin from the engaged position to the released position.

6. The reclinable child seat assembly of claim 5, wherein the driving ramp is provided in a recess in the arm, and wherein the contact surface is a protrusion projecting from the pin or the and seated against the driving ramp within the recess.

7. The reclinable child seat assembly of claim 1, further comprising:
  a guide slot on one of the support base or the seat shell and defining a first slot position corresponding to the first recline position and a second slot position corresponding to the second recline position; and
  a guide bar carried on the other of the seat shell the support base and received in the guide slot, wherein the guide bar slides along the guide slot between the first slot position and the second slot position when the seat shell is moved between the first and second recline positions.

8. The reclinable child seat assembly of claim 7, wherein the guide slot is open horizontally on the support base and the guide bar is fixedly attached to the seat shell and extends laterally through the guide slot.

9. The reclinable child seat assembly of claim 7, wherein the guide slot is on the support base and the guide bar is carried on the seat shell.

10. The reclinable child seat assembly of claim 1, wherein the recline positioner has a third portion defining a third recline position of the seat shell.

11. The reclinable child seat assembly of claim 1, wherein the recline mechanism has two of the recline positioners laterally spaced apart across the child seat assembly, two of the pins, one each associated with a respective one of the two recline positioners, and two of the leaf springs, one each coupled to a respective one of the two pins.

12. The reclinable child seat assembly of claim 11, wherein the release handle includes two arms, each arm operable to move a respective one of the two pins from the engaged position to the release position.

13. The reclinable child seat assembly of claim 11, wherein the recline positioners are on and laterally spaced apart across the support base, and wherein the pins, the leaf springs, and the release handle are mounted to the seat shell beneath the seating surface.

14. The reclinable child seat assembly of claim 1, wherein the recline positioner is on the support base, and wherein the pin, the leaf spring, and the release handle are mounted to the seat shell.

15. A reclinable child seat assembly comprising:
a support base configured to rest on a dedicated seat of a vehicle;
a seat shell defining a seat back, a seat bottom, and a seating surface and being supported on the support base; and
a recline mechanism configured to selectively permit adjustment of the seat shell relative to the support base between a first recline position and a second recline position different than the first recline position, the recline mechanism including
(a) a recline positioner having a first portion defining the first recline position and a second portion defining the second recline position,
(b) a pin movable between a released position and an engaged position and configured to engage, in the engaged position, a selected one of the first and second portions of the recline positioner to retain the seat shell in the corresponding first or second recline position,
(c) a biasing element coupled to the pin and configured to bias the pin to the engaged position,
(d) a release handle operable to move the pin from the engaged position to the released position out of engagement with the first and second portions of the recline positioner, and
(e) a driving ramp and a contact surface, wherein the release handle is operable to move the driving ramp and the contact surface relative to one another to move the pin from the engaged position to the released position,
wherein, when the pin is in the released position, the seat shell is movable between the first recline position and the second recline position.

16. A reclinable child seat assembly comprising:
a support base configured to rest on a dedicated seat of a vehicle;
a seat shell defining a seat back, a seat bottom, and a seating surface and being supported on the support base; and
a recline mechanism configured to selectively permit adjustment of the seat shell relative to the support base between a first recline position and a second recline position different than the first recline position, the recline mechanism including
(a) a track extending between a first aperture defining the first recline position and a second aperture defining the second recline position,
(b) a pin movable between an engaged position and a released position and configured to engage a selected one of the first and second apertures in the engaged position to retain the seat shell in the first and second recline positions, respectively,
(c) a biasing element coupled to the pin and configured to bias the pin to the engaged position, and
(d) a release handle operable to move the pin from the engaged position to the released position out of engagement with the first and second apertures,
wherein, when the pin is in the released position, the pin is slidable along the track between the first aperture and the second aperture and the seat shell is movable between the first recline position and the second recline position,
wherein first and second contact surfaces protrude from around the pin and a portion of the release handle includes first and second driving ramps engaging the first and second contact surfaces, respectively, of the pin, and
wherein the release handle is operable to move the driving ramps relative to the first and second contact surfaces, respectively, to move the pin from the engaged position to the released position.

17. The reclinable child seat assembly of claim 16, wherein the biasing element is a leaf spring.

18. The reclinable child seat assembly of claim 16, further comprising:
a guide slot on the support base and defining a first slot position corresponding to the first recline position and a second slot position corresponding to the second recline position;
a guide bar carried on the seat shell and received laterally through the guide slot, wherein the guide bar slides along the guide slot between the first and second slot positions when the seat shell is moved between the first and second recline positions.

19. A reclinable child seat assembly comprising:
a support base configured to rest on a dedicated seat of a vehicle;
a seat shell defining a seat back, a seat bottom, and a seating surface and being supported on the support base; and
a recline mechanism configured to selectively permit adjustment of the seat shell relative to the support base between a first recline position and a second recline position different than the first recline position, the recline mechanism including
(a) a recline positioner having a first portion defining the first recline position and a second portion defining the second recline position,
(b) a pin movable between a released position and an engaged position and configured to engage, in the engaged position, a selected one of the first and second portions of the recline positioner to retain the seat shell in the corresponding first or second recline position,
(c) a biasing element coupled to the pin and configured to bias the pin to the engaged position, and
(d) a release handle operable to move the pin from the engaged position to the released position out of engagement with the first and second portions of the recline positioner,
wherein, when the pin is in the released position, the seat shell is movable between the first recline position and the second recline position,
wherein the release handle has an actuator positioned along a front edge of the seat bottom of the seat shell and an arm extending rearward from the actuator, and
wherein the pin has a contact surface and the arm has a driving ramp engaging the contact surface, and wherein the release handle is operable to move the arm and the driving ramp to move the pin from the engaged position to the released position.

20. The reclinable child seat assembly of claim 19, wherein the driving ramp is provided in a recess in the arm, and wherein the contact surface is a protrusion projecting from the pin or the biasing element and seated against the driving ramp within the recess.

* * * * *